(12) United States Patent
Huang

(10) Patent No.: US 9,419,521 B2
(45) Date of Patent: Aug. 16, 2016

(54) CONTROL METHOD AND CONTROL APPARATUS USING CONTROL SIGNALS TO CONTROL STATES OF TRANSISTORS IN BUCK-BOOST TOPOLOGY

(71) Applicant: Huawei Technologies Co., Ltd., Shenzhen (CN)

(72) Inventor: Jinbo Huang, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 251 days.

(21) Appl. No.: 14/193,133

(22) Filed: Feb. 28, 2014

(65) Prior Publication Data

US 2014/0176103 A1    Jun. 26, 2014

Related U.S. Application Data

(63) Continuation of application No. PCT/CN2013/071614, filed on Feb. 17, 2013.

(30) Foreign Application Priority Data

Jul. 18, 2012    (CN) .......................... 2012 1 0249141

(51) Int. Cl.
*H02M 3/157* (2006.01)
*H02M 3/158* (2006.01)
*H02M 1/36* (2007.01)

(52) U.S. Cl.
CPC ............ *H02M 3/157* (2013.01); *H02M 3/1582* (2013.01); *H02M 1/36* (2013.01)

(58) Field of Classification Search
CPC ............... G05F 1/26; G05F 1/30; G05F 1/34; H02M 3/157; H02M 3/1582
USPC .......... 323/224, 225, 234, 247, 263, 282–284
See application file for complete search history.

(56) References Cited

U.S. PATENT DOCUMENTS 4,354,223 A * 10/1982 Turnbull ............. H02M 3/1582
                                                         318/811
4,958,121 A    9/1990 Cuomo et al.
(Continued)

FOREIGN PATENT DOCUMENTS

CN    1992494 A    7/2007
CN    101378228 A    3/2009
(Continued)

OTHER PUBLICATIONS

Foreign Communication From a Counterpart Application, European Application No. 13727019.5, Extended European Search Report dated Feb. 18, 2015, 6 pages.
(Continued)

*Primary Examiner* — Yemane Mehari
(74) *Attorney, Agent, or Firm* — Conley Rose, P.C.; Grant Rodolph; Nicholas K. Beaulieu

(57) ABSTRACT

A control method and a control apparatus are provided. The control method and apparatus are applied to a BUCK-BOOST topology. The method specifically is, processing an output signal of a topology to obtain a pulse width modulation signal, performing an OR operation between the pulse width modulation signal and a first modulation signal to obtain a first control signal so as to control a state of a first transistor on the topology, and performing an AND operation between the pulse width modulation signal and a second modulation signal to obtain a second control signal so as to control a state of a second transistor on the topology. Therefore, the method achieves three topology states and a smooth switchover among the three topology states. In addition, the control circuit is relatively simple, expanding the control scope and improving the control precision.

24 Claims, 12 Drawing Sheets

(56) References Cited

U.S. PATENT DOCUMENTS

| | | |
|---|---|---|
| 2007/0075687 A1 | 4/2007 | Ishii et al. |
| 2007/0120546 A1* | 5/2007 | Hagino ............... H02M 3/1582 323/282 |
| 2007/0145961 A1 | 6/2007 | Hasegawa et al. |
| 2007/0153553 A1 | 7/2007 | Cebry et al. |
| 2009/0201003 A1* | 8/2009 | Kobori ............... H02M 3/1582 323/284 |
| 2011/0101944 A1 | 5/2011 | Uchiike |
| 2012/0105038 A1 | 5/2012 | Chen et al. |
| 2012/0146594 A1 | 6/2012 | Kobayashi |

FOREIGN PATENT DOCUMENTS

| | | |
|---|---|---|
| CN | 101828328 A | 9/2010 |
| CN | 102739052 A | 10/2012 |
| EP | 2424097 A2 | 2/2012 |
| JP | 2009124844 A | 6/2009 |
| WO | 2009023380 A1 | 2/2009 |
| WO | 2009033924 A2 | 3/2009 |

OTHER PUBLICATIONS

Foreign Communication From A Counterpart Application, PCT Application No. PCT/CN2013/071614, English Transition of International Search Report dated May 23, 2013, 2 pages.

Foreign Communication From A Counterpart Application, PCT Application No. PCT/CN2013/071614, Written Opinion dated May 23, 2013, 6 pages.

Foreign Communication From A Counterpart Application, Chinese Application No. 201210249141.8, Chinese Office Action dated Feb. 27, 2014, 8 pages.

Ming, Q., et al., "Control Laws and Characters of Pulse Train Controlled Buck Converters," Journal of Southwest Jiaotong University, vol. 44, No. 5, Oct. 31, 2009, pp. 660-666.

Ming, Q., et al., "Control Laws and Characters of Pulse Train Controlled Buck Converters," Partial English Translation, Journal of Southwest Jiaotong University, vol. 44, No. 5, Aug. 20, 2014, 1 page.

Foreign Communication From A Counterpart Application, European Application No. 13727019.5, European Office Action dated Feb. 12, 2016, 6 pages.

* cited by examiner

CONTROL METHOD AND CONTROL APPARATUS USING CONTROL SIGNALS TO CONTROL STATES OF TRANSISTORS IN BUCK-BOOST TOPOLOGY

CROSS-REFERENCE TO RELATED APPLICATIONS

This application is a continuation of International Application No. PCT/CN2013/071614, filed on Feb. 17, 2013, which claims priority to Chinese Patent Application No. 201210249141.8, filed on Jul. 18, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a control method and a control apparatus.

BACKGROUND

With the increase of the power of a router, an entire enterprise network equipment, and a board, some high-power sub-rack-shaped equipment requires that a direct current/direct current (DC/DC) voltage regulator module in a system supports flexible configuration, so as to meet customers' requirements for investment and power distribution in an equipment room. To improve the conversion efficiency of a DC/DC voltage regulator module, a single-inductor buck-boost (BUCK-BOOST) topology is used, which is a topological structure supporting a DC/DC voltage regulator module in achieving high efficiency.

FIG. 1 is a circuit diagram of a single-inductor buck-boost topology in the prior art. As illustrated in FIG. 1, a metal-oxide-semiconductor field-effect transistor (MOSFET) T1, a MOSFET T3, an inductor L1 form a buck conversion circuit, that is, a BUCK circuit, and a MOSFET T2, a MOSFET T4, the inductor L1 form a boost conversion circuit, that is, a BOOST circuit. The circuit of the topology needs to, based on an input signal, perform a switchover among three topology states: buck, pass, and boost.

Currently, a method for controlling a switchover among three topology states is to check the state of an input signal by using three comparators. The state of an input signal is transmitted to a complex programmable logic device (CPLD) by using an optocoupler. Then, the CPLD determines the state of the BUCK-BOOST topology based on the state of the input signal. Finally, a pulse width modulation (PWM) controller controls a switchover among three topology states based on the state of the BUCK-BOOST topology. For example, when an input signal is in the range from 36 volts (V) to 48V, the topology enters the BOOST state; when the input signal is in the range from 46V to 54V, the topology enters the PASS state; and when the input signal is in the range from 52V to 72V, the topology enters the BUCK state. When a topology state switchover is being performed, the state of the PWM controller also changes suddenly. To prevent the state of a PWM controller from changing suddenly, a soft start needs to be implemented during a switchover among three topology states: buck, boost, and pass. The foregoing control method is capable of achieving a switchover among three topology states: BUCK, PASS, and BOOST.

However, specific implementation of the control method is very complicated, and the implementation circuit includes a power nonconventional device like CPLD. In addition, because the adjustment output signal in the BUCK state is different from the adjustment output signal in the BOOST state due to the issue related to the maximum duty cycle of a PWM controller, different modules cannot be in the BUCK state and the BOOST state simultaneously, directly resulting in that different modules cannot work in a scenario in which input signals dramatically differ from each other. The prior art cannot meet the demand that a system requires a plurality of DC/DC voltage regulator modules to work in parallel and achieve current equalization.

SUMMARY

Embodiments of the present invention provide a control method and a control apparatus to resolve, to a certain extent, problems in the prior art that a control circuit is complicated and that a soft start needs to be implemented during a state switchover, thus achieving a smooth switchover among three topology states.

In the first aspect, a control method is provided in the present invention. The method is applied to a BUCK-BOOST topology, and includes: processing an output signal of the topology to obtain a PWM signal; performing an OR operation between the PWM signal and a first modulation signal to obtain a first control signal, so as to control a state of a first transistor on the topology; and performing an AND operation between the PWM signal and a second modulation signal to obtain a second control signal, so as to control a state of a second transistor on the topology.

In the second aspect, a control apparatus is provided in the present invention. The apparatus is applied to a BUCK-BOOST topology, and includes a PWM signal generating circuit, an OR gate, and an AND gate. An input end of the PWM signal generating circuit is connected to an output end of the topology, an output end of the PWM signal generating circuit is connected to each of an input end of the OR gate and an input end of the AND gate, an output end of the OR gate is connected to a gate of a first transistor on the topology, and an output end of the AND gate is connected to a gate of a second transistor on the topology. The PWM signal generating circuit is configured to process an output signal of the topology to obtain a PWM signal, and to transmit the PWM signal to the OR gate and the AND gate. The OR gate is configured to receive the PWM signal from the PWM signal generating circuit, and perform an OR operation between the PWM signal and a first modulation signal to obtain a first control signal, so as to control a state of the first transistor on the topology. The AND gate is configured to receive the PWM signal from the PWM signal generating circuit, and perform an AND operation between the PWM signal and a second modulation signal to obtain a second control signal, so as to control a state of the second transistor on the topology.

Therefore, the method and apparatus disclosed in embodiments of the present invention use a PWM signal generating circuit to process an output signal of a topology to obtain a PWM signal; perform an OR operation between the PWM signal and a first modulation signal to obtain a first control signal, so as to control a state of a first transistor on the topology, where the first transistor may be in switch mode or constant on mode; and perform an AND operation between the PWM signal and a second modulation signal to obtain a second control signal, so as to control a state of a second transistor on the topology, where the second transistor may be in constant off mode or switch mode. When the first transistor is in switch mode and the second transistor is in constant off mode, the topology is in the BUCK state; when the first transistor is in constant on mode and the second transistor is in switch mode, the topology is in the BOOST state; and when the first transistor is in constant on mode and the second transistor is in constant off mode, the topology is in the PASS state. Application of the method and apparatus disclosed in embodiments of the present invention can achieve three topology states and a smooth switchover among the three topology states. In addition, the control circuit is relatively simple, expanding the control scope and improving the control precision.

DETAILED DESCRIPTION

To make the objectives, technical solutions, and advantages of the embodiments of the present invention more clear, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

The present invention discloses a control method and a control apparatus. By processing an output signal of a BUCK-BOOST topology to obtain a PWM signal; performing an OR operation between the PWM signal and a first modulation signal to obtain a first control signal and simultaneously performing an AND operation between the PWM signal and a second modulation signal to obtain a second control signal; and using the first control signal and the second control signal to control the high-side transistor of the BUCK circuit and the low-side transistor of the BOOST circuit on the BUCK-BOOST topology, a smooth switchover among three states of the BUCK-BOOST topology is achieved and a special soft start operation is not required.

Figure 1:
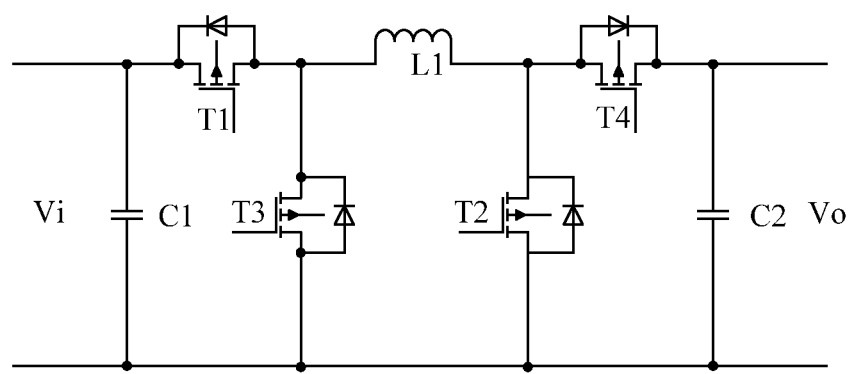
FIG. 1 is a circuit diagram of a single-inductor BUCK-BOOST topology according to Embodiment 1 of the present invention.

FIG. 1 is a circuit diagram of a single-inductor BUCK-BOOST topology according to Embodiment 1 of the present invention. As illustrated in the figure, a single-inductor BUCK-BOOST topology primarily includes a first transistor T1, a second transistor T2, a third transistor T3, a fourth transistor T4, and an inductor L1. The first transistor T1, the third transistor T3, and the inductor L1 form a BUCK circuit, where the first transistor T1 is the high-side transistor of the BUCK circuit and the third transistor T3 is the low-side transistor of the BUCK circuit. The second transistor T2, the fourth transistor T4, and the inductor L1 form a BOOST circuit, where the second transistor T2 is the low-side transistor of the BOOST circuit and the fourth transistor T4 is the high-side transistor of the BOOST circuit. Additionally, the voltage of an input signal of the topology is represented by $V_i$, and the voltage of an output signal of the topology is represented by $V_o$. When the voltage $V_i$ of an input signal is higher than the voltage $V_o$ of an output signal, the first transistor T1 and the third transistor T3 are in switch mode, the second transistor T2 is in constant off mode, and the fourth transistor T4 is in constant on mode. In this case, the state of the topology is defined as the BUCK state. When the voltage $V_i$ of an input signal is very close to the voltage $V_o$ of an output signal, the second transistor T2 and the third transistor T3 are in constant off mode, and the first transistor T1 and the fourth transistor T4 are in constant on mode. In this case, the state of the topology is defined as the PASS state. When the voltage $V_i$ of an input signal is lower than the voltage $V_o$ of an output signal, the second transistor T2 and the fourth transistor T4 are in switch mode, the third transistor T3 is in constant off mode, and the first transistor T1 is in constant on mode. In this case, the state of the topology is defined as the BOOST state. When the topology is in the BUCK state, the BUCK circuit enters the switch mode and the BOOST circuit enters the constant on mode; when the topology is in the BOOST state, the BUCK circuit enters the constant on mode and the BOOST circuit enters the switch mode; when the topology is in the PASS state, both the BUCK circuit and the BOOST circuit enter the constant on mode.

The first transistor T1 and the second transistor T2 are switch transistors, for example, a triode, a MOSFET transistor, or an insulated-gate bipolar transistor (IGBT). The third transistor T3 and the fourth transistor T4 may also be switch transistors or diodes.

When the third transistor T3 and the fourth transistor T4 are diodes, taking the BUCK circuit as an example, the first transistor T1, that is, the high-side transistor of the BUCK circuit, is a switch transistor, and the third transistor T3, that is, the low-side transistor of the BUCK circuit, is a diode. When the high-side transistor of the BUCK circuit conducts, the diode T3 bears a reverse voltage at both ends, and as a result, the diode T3 turns off, that is, enters the off state. When the high-side transistor of the BUCK circuit turns off, because the current in the inductor L will freewheel, the freewheeling current forces the diode T3 to conduct, that is, to enter the on state. Therefore, when a diode is used, the diode turns off when the high-side transistor conducts, and conducts when the high-side transistor turns off. The conduction relationship of a diode is the same as the switching sequence when a low-side transistor is a switch transistor, and details are not provided herein again.

The foregoing "switch mode" indicates that both the on and off states exist in a cycle time. For example, it is assumed that the frequency of a switching mode power supply is 100 kilohertz (kHz) and the cycle T of the switching mode power supply is 10 microseconds (us). It is also assumed that the duty cycle of a transistor is 30%. That is, the transistor is on in 30% of the time and off in 70% of the time, or is on in 3 us and off in 7 us. The transistor also enters this on/off state in a next cycle. Therefore, the "switch mode" mentioned in all the following embodiments provided for the present invention indicates that both the on and off states exist in a cycle time.

Figure 2:
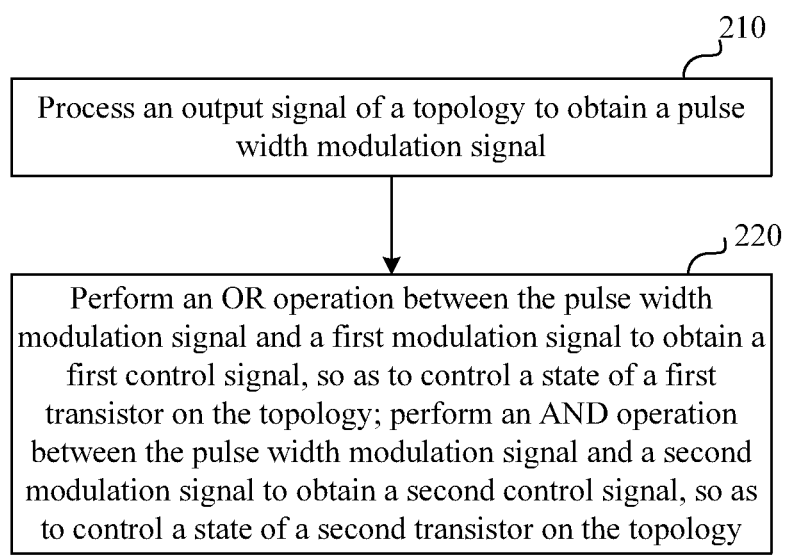
FIG. 2 is a flowchart of a control method according to Embodiment 2 of the present invention.

FIG. 2 is a flowchart of a control method according to an embodiment of the present invention. As shown in the figure, the embodiment of the present invention specifically includes the following steps:

Step 210: Process an output signal of a single-inductor BUCK-BOOST topology to obtain a PWM signal, that is, a PWM modulation signal. In the prior art, a circuit generating a PWM modulation signal is a PWM modulation signal generating circuit. The PWM modulation signal generating circuit generally consists of a loop circuit and a comparator.

Specifically, the working principles of the PWM modulation signal generating circuit are as follows: when the voltage $V_o$ of an output signal increases, resulting in that the voltage $V_{fb}$ of a feedback signal is higher than the voltage $V_{ref}$ of a reference signal, the voltage of a loop COMP signal output by the loop circuit decreases, and after the voltage of the loop COMP signal is compared with the voltage of a comparison signal, the duty cycle of an output PWM modulation signal decreases, with the final aim of decreasing the voltage $V_o$ of the output signal; when the voltage $V_o$ of the output signal decreases, resulting in that the voltage $V_{fb}$ of the feedback signal is lower than the voltage $V_{ref}$ of the reference signal, the voltage of a loop COMP signal output by the loop circuit increases, and after the voltage of the loop COMP signal is compared with the voltage of the comparison signal, the duty cycle of an output PWM modulation signal increases, with the final aim of increasing the voltage $V_o$ of the output signal.

The following describes how to obtain the PWM modulation signal based on the output signal of the topology in detail.

First, obtain the loop signal based on the output signal of the topology and the reference signal.

Figure 3:
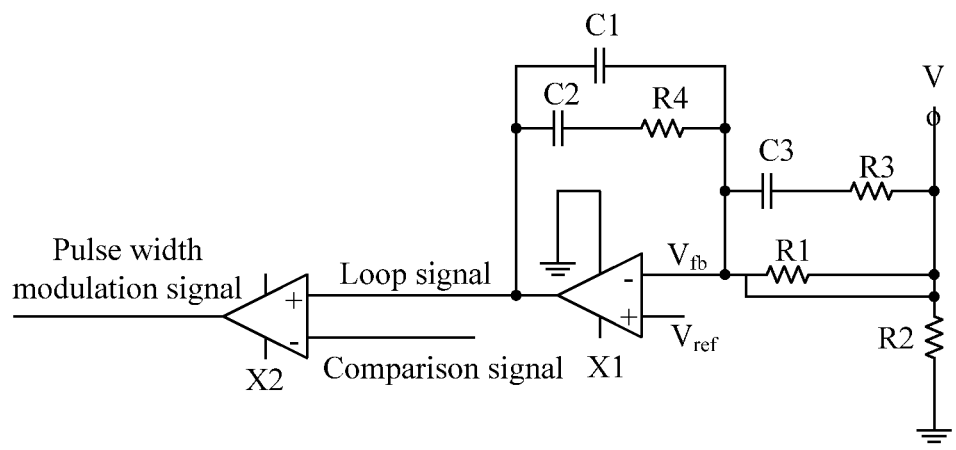
FIG. 3 is a schematic diagram of a PWM signal generating circuit according to Embodiment 3 of the present invention.

Specifically, an operational amplifier on the loop circuit performs operational amplification on an input feedback signal of the output signal of the topology and on the reference signal. When the voltage of the feedback signal is higher than the voltage of the reference signal, the voltage of the output signal of the operational amplifier decreases, and when the voltage of the feedback signal is lower than the voltage of the reference signal, the voltage of the output signal of the operational amplifier increases. In this way, the loop signal is obtained. Its used circuit is a typical loop circuit, as illustrated in FIG. 3. The loop circuit is a negative feedback circuit, consisting of an operational amplifier X1, peripheral capacitors C1, C2, and C3, and resistors R1, R2, R3, and R4, where, at the negative input end of the operational amplifier X1, the voltage $V_{fb}$ of the feedback signal of the voltage $V_o$ of the output signal is input. The relationship between the voltage $V_{fb}$ of the feedback signal and the voltage $V_o$ of the output signal is shown in Formula (1).

$$V_{fb} = V_O \times \frac{R2}{R1 + R2} \qquad \text{Formula (1)}$$

At the positive input end of the operational amplifier X1, the voltage $V_{ref}$ of the reference signal is input, where the value range of the voltage $V_{ref}$ of the reference signal is self-defined, ranging from 0.8V to 3V. Generally, voltage adjustment on a digital switchmode power supply is achieved by adjusting $V_{ref}$. Finally, after the operational amplifier X1 performs an operation, the loop circuit outputs the voltage of the loop COMP signal. The relationship between the voltage $V_o$ of the output signal and the voltage of the COMP signal is as follows: when the voltage $V_o$ of the output signal increases, resulting in that the voltage $V_{fb}$ of the feedback signal of the voltage $V_o$ of the output signal is higher than the voltage $V_{ref}$ of the reference signal, the operational amplifier X1 outputs a low level, that is, the COMP level decreases, resulting in that the duty cycle of an output PWM signal decreases and finally the output voltage $V_o$ decreases; when the voltage $V_o$ of the output signal decreases, the voltage of the COMP signal increases, resulting in that the duty cycle of the output PWM signal increases and finally the output voltage $V_o$ increases. Therefore, the function of the loop circuit is, through such a negative feedback function, to enable $V_{fb}$ to be equal to $V_{ref}$, and finally ensure that the voltage $V_o$ of the output signal stabilizes at a fixed value.

Second, obtain the PWM signal based on the loop signal and the comparison signal.

Specifically, the loop signal and the comparison signal, for example, a sawtooth wave signal, are input into a comparator X2, as illustrated in FIG. 3. After the comparator X2 performs comparison, a PWM modulation signal is obtained. The loop signal is input into the positive input end of the comparator X2, and the comparison signal is input into the negative input end of the comparator X2. The comparison signal may be a sawtooth wave, a triangular wave, a resistor-capacitor (RC) charging waveform, or a voltage signal converted from current sampling, and so on. The working principles of the comparator X2 are as follows: when the voltage of the loop signal is higher than the voltage of the comparison signal, the comparator X2 outputs a high level, and when the voltage of the loop signal is lower than the voltage of the comparison signal, the comparator X2 outputs a low level; in this way, the PWM signal is obtained.

The foregoing loop circuit or comparator may be achieved using an analog circuit or a digital circuit. Both analog and digital circuits are relatively mature technologies among existing technologies, so details are not provided herein again. The embodiments of the present invention may use any PWM modulation signal generating circuit. Therefore, all PWM modulation signal generating circuits apply to the present invention.

Step 220: Perform an OR operation between the PWM modulation signal and a first modulation signal D1 to obtain a first control signal S1, so as to control a state of a first transistor T1 on the topology; perform an AND operation between the PWM modulation signal and a second modulation signal D2 to obtain a second control signal S2, so as to control a state of a second transistor T2 on the topology, where the first modulation signal, the second modulation signal, and the PWM modulation signal are synchronous, and the falling edges of the first modulation signal and the second modulation signal and the rising edge of the PWM modulation signal occur at the same time.

Specifically, the PWM modulation signal and the first modulation signal D1 are input into an OR gate U1, the first control signal S1 is obtained after the OR gate U1 performs an operation on the signals, and the OR gate U1 uses the first control signal S1 to control the first transistor T1 on the single-inductor BUCK-BOOST topology, where, an input end of the OR gate U1 inputs the PWM modulation signal, and another input end inputs the first modulation signal D1, where the first modulation signal D1 is pre-set based on actual situations.

Specifically, the PWM modulation signal and the second modulation signal D2 are input into an AND gate U2, the second control signal S2 is obtained after the AND gate U2 performs an operation on the signals, and the AND gate U2 uses the second control signal S2 to control the second transistor T2 on the single-inductor BUCK-BOOST topology, where, an input end of the AND gate U2 inputs the PWM modulation signal, and another input end inputs the second modulation signal D2, where the second modulation signal D2 is pre-set based on actual situations.

The first control signal controls the first transistor on the single-inductor BUCK-BOOST topology, the signal obtained after a first NOT gate performs a NOT operation on the first control signal S1 controls a third transistor T3 on the topology, and the signal obtained after a second NOT gate performs a NOT operation on the second control signal S2 controls a fourth transistor T4 on the topology.

Additionally, the third transistor T3 and the fourth transistor T4 may be switch transistors or diodes. When the third transistor T3 and the fourth transistor T4 are switch transistors, they need to be controlled by the first control signal S1 and the second control signal S2. When the third transistor T3 and the fourth transistor T4 are diodes, they do not need to be controlled by the signal obtained after the first NOT gate performs a NOT operation on the first control signal S1 and by the signal obtained after the second NOT gate performs a NOT operation on the second control signal S2. A diode is capable of automatically performing an on-off action.

The following takes the assumption that the third transistor T3 and the fourth transistor T4 are switch transistors as an example to describe how the control method provided in embodiments of the present invention achieves the three topology states BUCK, PASS, and BOOST in detail. The duty cycle of the first modulation signal D1 is represented by r1, the duty cycle of the second modulation signal D2 is represented by r2, the duty cycle of the PWM signal is represented by r, the duty cycle of the first control signal S1 is represented by z1, and the duty cycle of the second control signal S2 is represented by z2. In addition, 1−r1, that is, the difference between 1 and the duty cycle of the first modulation signal D1, is a first threshold, and 1−r2, that is, the difference between 1 and the duty cycle of the second modulation signal D2, is a second threshold.

First, the process of how the BUCK state is achieved is described.

When the duty cycle r of the PWM modulation signal is less than 1−r1 and less than or equal to 1−r2: the OR gate performs an OR operation between the PWM modulation signal and the first modulation signal D1 to obtain the first control signal S1, to control the first transistor T1 on a topology to be in switch mode, where the duty cycle z1 of the first control signal S1 is r+r1; the AND gate performs an AND operation between the PWM modulation signal and the second modulation signal D2 to obtain the low-level second control signal S2, to control the second transistor T2 on the topology to be in constant off mode, where the duty cycle z2 of the second control signal S2 is 0; a NOT operation is performed on the first control signal S1, to control the third transistor T3 on the topology to be in switch mode, and in this case, the BUCK circuit is in the BUCK state; a NOT operation is performed on the second control signal S2, to control the fourth transistor T4 on the topology to be in constant on mode, and in this case, the BOOST circuit is in the PASS state. Therefore, in this case, the topology is in the BUCK state.

Figure 4:
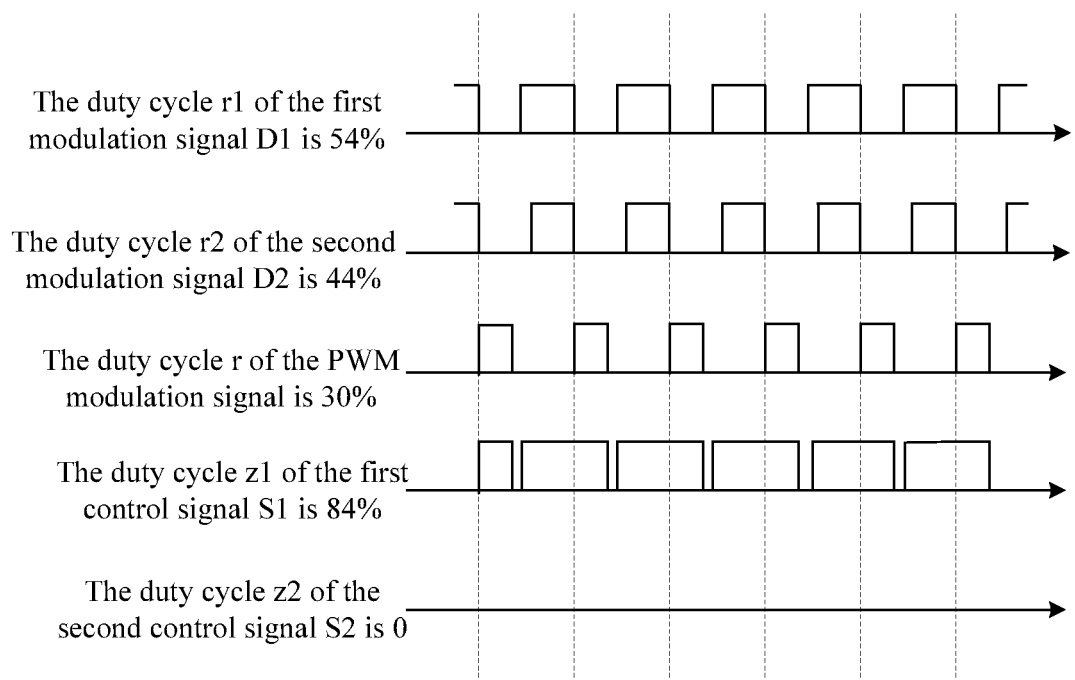
FIG. 4 is a schematic diagram of a first modulation signal, a second modulation signal, a PWM signal, a first control signal, and a second control signal in a control method according to Embodiment 4 of the present invention.

For example, reference is made to FIG. 4. When the duty cycle r1 of the first modulation signal D1 is greater than the duty cycle r2 of the second modulation signal D2, assuming that the duty cycle r1 of the first modulation signal D1 is 54%, that the duty cycle r2 of the second modulation signal D2 is 44%, and that the duty cycle r of the PWM modulation signal is 30%, the OR gate performs an OR operation between the PWM modulation signal and the first modulation signal D1 to obtain that the duty cycle z1 of the first control signal S1 is 84%, and the AND gate performs an AND operation between the PWM modulation signal and the second modulation signal D2 to obtain that the duty cycle z2 of the second control signal S2 is 0. Therefore, in this case, the topology is in the BUCK state.

Figure 5:
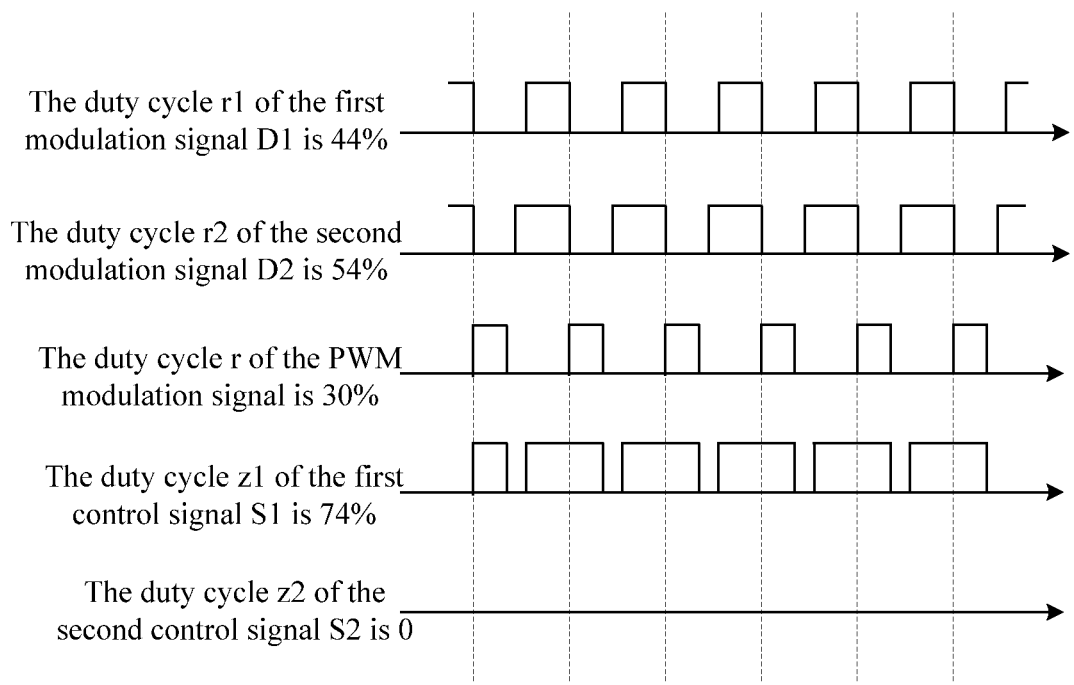
FIG. 5 is a schematic diagram of a first modulation signal, a second modulation signal, a PWM signal, a first control signal, and a second control signal in a control method according to Embodiment 5 of the present invention.

Reference is made to FIG. 5. When the duty cycle r1 of the first modulation signal D1 is less than the duty cycle r2 of the second modulation signal D2, assuming that the duty cycle r1 of the first modulation signal D1 is 44%, that the duty cycle r2 of the second modulation signal D2 is 54%, and that the duty cycle r of the PWM modulation signal is 30%, the OR gate performs an OR operation between the PWM modulation signal and the first modulation signal D1 to obtain that the duty cycle z1 of the first control signal S1 is 74%, and the AND gate performs an AND operation between the PWM modulation signal and the second modulation signal D2 to obtain that the duty cycle z2 of the second control signal S2 is 0. Therefore, in this case, the topology is in the BUCK state.

Figure 6:
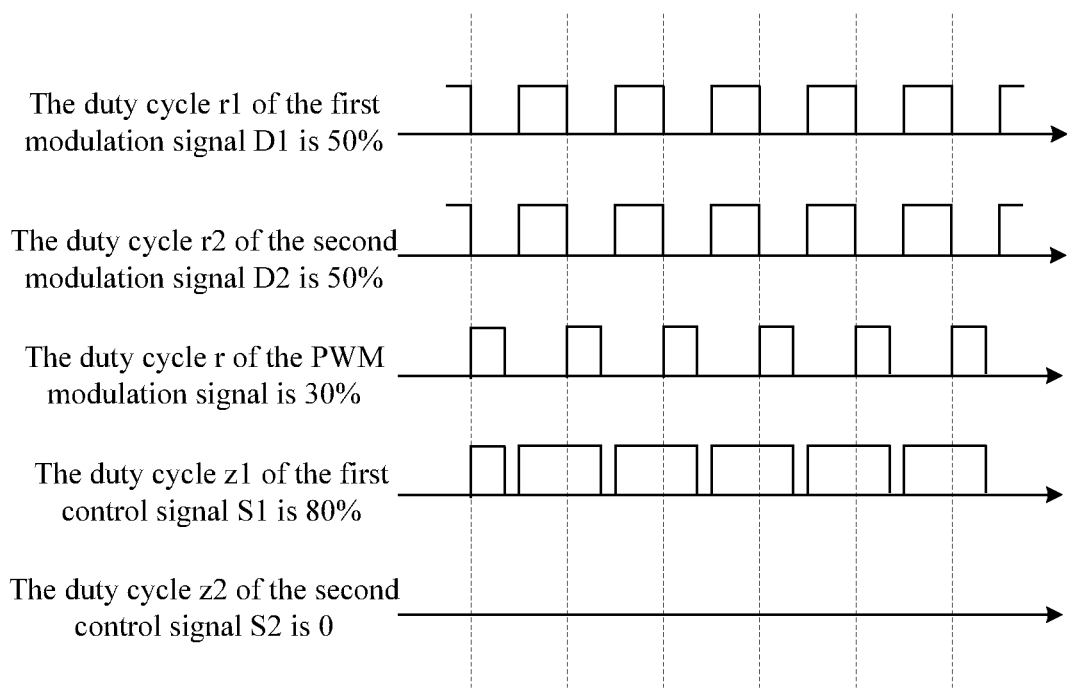
FIG. 6 is a schematic diagram of a first modulation signal, a second modulation signal, a PWM signal, a first control signal, and a second control signal in a control method according to Embodiment 6 of the present invention.

Reference is made to FIG. 6. When the duty cycle r1 of the first modulation signal D1 is equal to the duty cycle r2 of the second modulation signal D2, assuming that the duty cycle r1 of the first modulation signal D1 is 50%, that the duty cycle r2 of the second modulation signal D2 is 50%, and that the duty cycle r of the PWM modulation signal is 30%, the OR gate performs an OR operation between the PWM modulation signal and the first modulation signal D1 to obtain that the duty cycle z1 of the first control signal S1 is 80%, and the AND gate performs an AND operation between the PWM modulation signal and the second modulation signal D2 to obtain that the duty cycle z2 of the second control signal S2 is 0. Therefore, in this case, the topology is in the BUCK state.

Second, the process of how the BOOST state is achieved is described.

When the duty cycle r of the PWM modulation signal is greater than 1−r2 and greater than or equal to 1−r1: the OR gate performs an OR operation between the PWM modulation signal and the first modulation signal D1 to obtain the high-level first control signal S1, to control the first transistor T1 on the topology to be in constant on mode, where the duty cycle z1 of the first control signal S1 is 100%; the AND gate performs an AND operation between the PWM modulation signal and the second modulation signal D2 to obtain the second control signal S2, to control the second transistor T2 on the topology to be in switch mode, where the duty cycle z2 of the second control signal S2 is r−(1−r2); a NOT operation is performed on the first control signal S1, to control the third transistor T3 on the topology to be in constant off mode, and in this case, the BUCK circuit is in the PASS state; a NOT operation is performed on the second control signal S2, to control the fourth transistor T4 on the topology to be in switch mode, and in this case, the BOOST circuit is in the BOOST state. Therefore, in this case, the topology is in the BOOST state.

Figure 7:
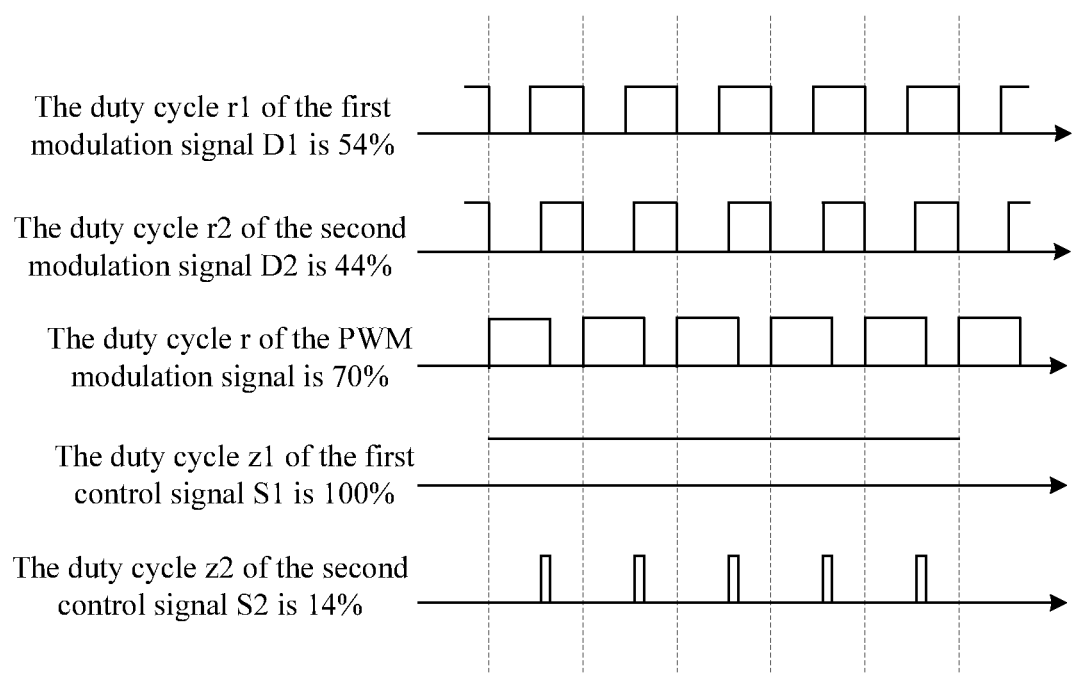
FIG. 7 is a schematic diagram of a first modulation signal, a second modulation signal, a PWM signal, a first control signal, and a second control signal in a control method according to Embodiment 7 of the present invention.

For example, reference is made to FIG. 7. When the duty cycle r1 of the first modulation signal D1 is greater than the duty cycle r2 of the second modulation signal D2, assuming that the duty cycle r1 of the first modulation signal D1 is 54%, that the duty cycle r2 of the second modulation signal D2 is 44%, and that the duty cycle r of the PWM modulation signal is 70%, the OR gate performs an OR operation between the PWM modulation signal and the first modulation signal D1 to obtain that the duty cycle z1 of the first control signal S1 is 100%, and the AND gate performs an AND operation between the PWM modulation signal and the second modulation signal D2 to obtain that the duty cycle z2 of the second control signal S2 is 14%. Therefore, in this case, the topology is in the BOOST state.

Figure 8:
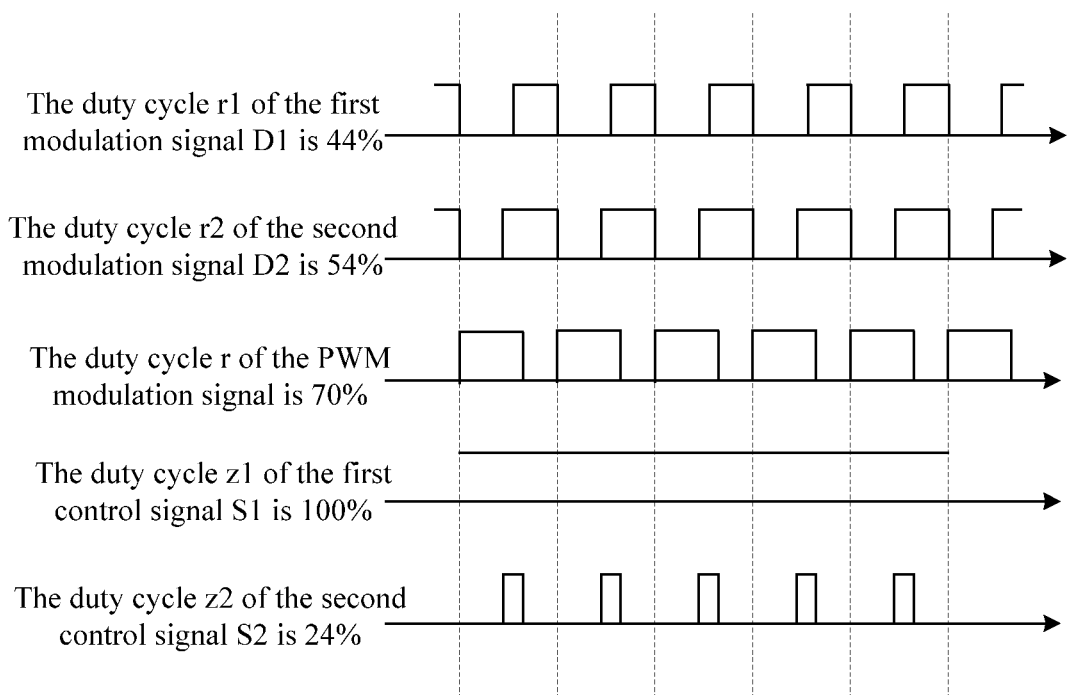
FIG. 8 is a schematic diagram of a first modulation signal, a second modulation signal, a PWM signal, a first control signal, and a second control signal in a control method according to Embodiment 8 of the present invention.

Reference is made to FIG. 8. When the duty cycle r1 of the first modulation signal D1 is less than the duty cycle r2 of the second modulation signal D2, assuming that the duty cycle r1 of the first modulation signal D1 is 44%, that the duty cycle r2 of the second modulation signal D2 is 54%, and that the duty cycle r of the PWM modulation signal is 70%, the OR gate performs an OR operation between the PWM modulation signal and the first modulation signal D1 to obtain that the duty cycle z1 of the first control signal S1 is 100%, and the AND gate performs an AND operation between the PWM modulation signal and the second modulation signal D2 to obtain that the duty cycle z2 of the second control signal S2 is 24%. Therefore, in this case, the topology is in the BOOST state.

Figure 9:
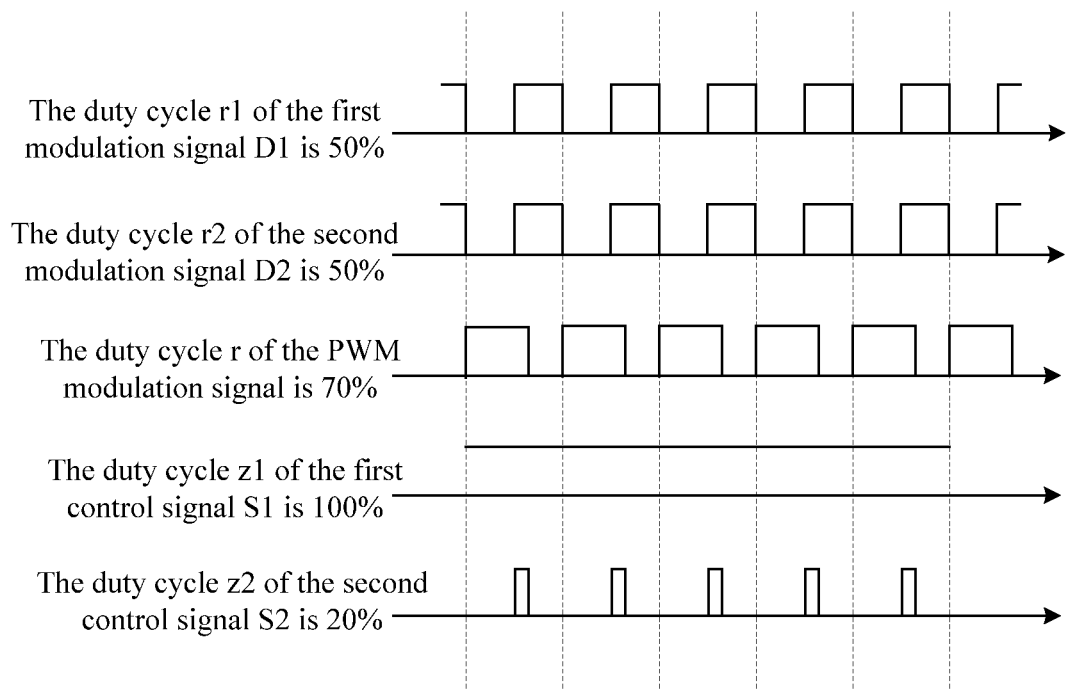
FIG. 9 is a schematic diagram of a first modulation signal, a second modulation signal, a PWM signal, a first control signal, and a second control signal in a control method according to Embodiment 9 of the present invention.

Reference is made to FIG. 9. When the duty cycle r1 of the first modulation signal D1 is equal to the duty cycle r2 of the second modulation signal D2, assuming that the duty cycle r1 of the first modulation signal D1 is 50%, that the duty cycle r2 of the second modulation signal D2 is 50%, and that the duty cycle r of the PWM modulation signal is 70%, the OR gate performs an OR operation between the PWM modulation signal and the first modulation signal D1 to obtain that the duty cycle z1 of the first control signal S1 is 100%, and the AND gate performs an AND operation between the PWM modulation signal and the second modulation signal D2 to obtain that the duty cycle z2 of the second control signal S2 is 20%. Therefore, in this case, the topology is in the BOOST state.

Third, the process of how the PASS state is achieved is described.

Assuming that the duty cycle r1 of the first modulation signal D1 is greater than the duty cycle r2 of the second modulation signal D2, when the duty cycle r of the PWM modulation signal is greater than 141 and less than 1−r2: the OR gate performs an OR operation between the PWM modulation signal and the first modulation signal D1 to obtain the high-level first control signal S1, to control the first transistor T1 on the topology to be in constant on mode, where the duty cycle z1 of the first control signal S1 is 100%; the AND gate performs an AND operation between the PWM modulation signal and the second modulation signal D2 to obtain the low-level second control signal S2, to control the second transistor T2 on the topology to be in constant off mode, where the duty cycle z2 of the second control signal S2 is 0; a NOT operation is performed on the first control signal S1, to control the third transistor T3 on the topology to be in constant off mode, and in this case, the BUCK circuit is in the PASS state; a NOT operation is performed on the second control signal S2, to control the fourth transistor T4 on the topology to be in constant on mode, and in this case, the BOOST circuit is in the PASS state. Therefore, in this case, the topology is in the PASS state.

Figure 10:
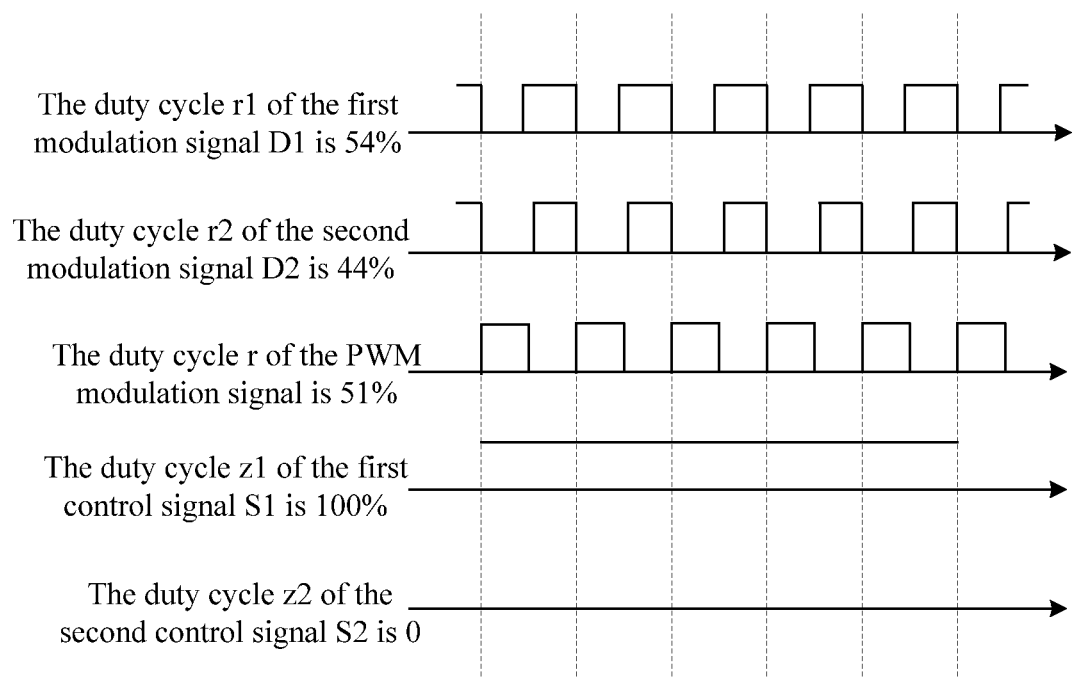
FIG. 10 is a schematic diagram of a first modulation signal, a second modulation signal, a PWM signal, a first control signal, and a second control signal in a control method according to Embodiment 10 of the present invention.

For example, reference is made to FIG. 10. Assuming that the duty cycle r1 of the first modulation signal D1 is 54%, that the duty cycle r2 of the second modulation signal D2 is 44%, and that the duty cycle r of the PWM modulation signal is 51%, the OR gate performs an OR operation between the PWM modulation signal and the first modulation signal D1 to obtain that the duty cycle z1 of the first control signal S1 is 100%, and the AND gate performs an AND operation between the PWM modulation signal and the second modulation signal D2 to obtain that the duty cycle z2 of the second control signal S2 is 0. Therefore, in this case, the topology is in the PASS state.

In addition, the entering to the PASS state may also be achieved by checking the level of a loop COMP signal. Specifically, directly enabling, after determining that the level of a loop COMP signal is in the range from a first level threshold to a second level threshold, both the high-side transistor of a BUCK circuit and the high-side transistor of a BOOST circuit to be in constant on mode, may also enable a single-inductor BUCK-BOOST topology to enter the PASS state.

The foregoing method for achieving the PASS state has a problem: even though the voltage difference between an input voltage and an output voltage is very small, due to the effect of loop integration, a loop circuit, sooner or later, results in that a COMP signal exceeds the signal range of the PASS state, or the duty cycle of the PWM modulation signal r exceeds the (1−r1)~(1−r2) range, and consequently, the circuit switches over repeatedly between the PASS state and a non-PASS state. Using the following method can achieve the absolute PASS state: detecting an input signal $V_i$, an output signal $V_o$, and output currents, and forcibly maintaining, when the input signal $V_i$ and the output signal $V_o$ are approximately equal to each other and when the output current of each module is relatively balanced, the level of the loop signal in the signal range within which the BUCK-BOOST topology is in the PASS state. This method uses the manner of clamping the COMP level to achieve the PASS state, and ensures a very high efficiency for a voltage regulating DC/DC module in a system when the input voltage and the output voltage are close to each other.

Further, when it is assumed that the duty cycle r1 of the first modulation signal D1 is less than the duty cycle r2 of the second modulation signal D2, and when the duty cycle r of the PWM modulation signal is greater than 1−r2 and less than 1−r1 : the OR gate performs an OR operation between the PWM modulation signal and the first modulation signal D1 to obtain the first control signal S1, to control the first transistor T1 on the topology to be in switch mode, where the duty cycle z1 of the first control signal S1 is equal to r+r1; the AND gate performs an AND operation between the PWM modulation signal and the second modulation signal D2 to obtain the second control signal S2, to control the second transistor T2 on the topology to be in switch mode, where the duty cycle z2 of the second control signal S2 is r-(1−r2); a NOT operation is performed on the first control signal S1, to control the third transistor T3 on the topology to be in switch mode, and in this case, the BUCK circuit is in the BUCK state; a NOT operation is performed on the second control signal S2, to control the fourth transistor T4 on the topology to be in switch mode, and in this case, the BOOST circuit is in the BOOST state. Therefore, in this case, the topology is in the BUCK-BOOST state.

Figure 11:
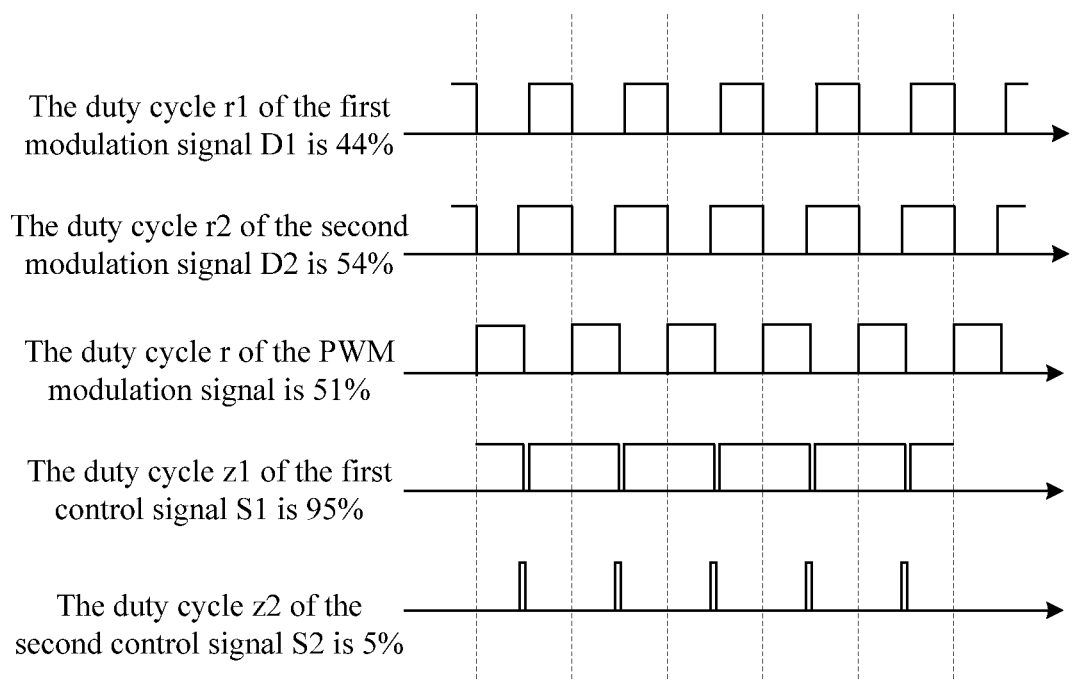
FIG. 11 is a schematic diagram of a first modulation signal, a second modulation signal, a PWM signal, a first control signal, and a second control signal in a control method according to Embodiment 11 of the present invention.

For example, reference is made to FIG. 11. Assuming that the duty cycle r1 of the first modulation signal D1 is 44%, that the duty cycle r2 of the second modulation signal D2 is 54%, and that the duty cycle r of the PWM modulation signal is 51%, the OR gate performs an OR operation between the PWM modulation signal and the first modulation signal D1 to obtain that the duty cycle z1 of the first control signal S1 is 95%, and the AND gate performs an AND operation between the PWM modulation signal and the second modulation signal D2 to obtain that the duty cycle z2 of the second control signal S2 is 5%. Therefore, in this case, the topology is in the BUCK-BOOST state.

In addition, the control method provided in embodiments of the present invention also ensures a smooth switchover between the BUCK state and the BOOST state. For example, when the duty cycle of a first modulation signal is 55%, the duty cycle of a second modulation signal is 45%, the voltage $V_i$ of an input signal is a high voltage, for example, 75V, and the voltage $V_o$ of an output signal is 50V, the BUCK-BOOST topology works in the BUCK state. When the input signal jumps, that is, the voltage of the input signal falls from a high voltage to a relatively low voltage, for example, jumping from 75V to 36V, the duty cycle of the PWM signal output by the loop circuit and the comparator changes from a small value to a large value. After the AND gate and the NOT gate perform operations for the PWM signal, the duty cycle of the first control signal gradually becomes larger and larger until the first transistor T1, that is, the high-side transistor of the BUCK circuit, is completely in constant on mode and the BUCK-BOOST topology enters the PASS state. When the duty cycle of the PWM modulation signal further increases, the duty cycle of the low-side transistor of the BOOST circuit starts to increase slowly from 0, until the BUCK-BOOST topology enters the BOOST state. During the entire switchover from the BUCK state to the BOOST state, the duty cycle of the high-side transistor of the BUCK circuit gradually increases until it enters the constant on mode, and the duty cycle of the low-side transistor of the BOOST circuit gradually increases from 0. The switchover process is very smooth and does not require an extra soft start operation. Additionally, this control method also ensures that different voltage regulating DC/DC modules in a system can work normally in the scenario in which the input voltage difference is relatively large.

Therefore, the control method provided in embodiments of the present invention, by processing an output signal of a single-inductor BUCK-BOOST topology to obtain a PWM signal, performing an OR operation between the PWM signal and a first modulation signal to obtain a first control signal so as to control a first transistor on the topology, and simultaneously performing an AND operation between the PWM signal and a second modulation signal to obtain a second control signal so as to control a second transistor, three topology states BUCK, PASS, and BOOST are achieved, and a smooth switchover among the three topology states is achieved, and a special soft start operation is not required. The method, with simple implementation, can be applied in different input signal scenarios.

Figure 12:
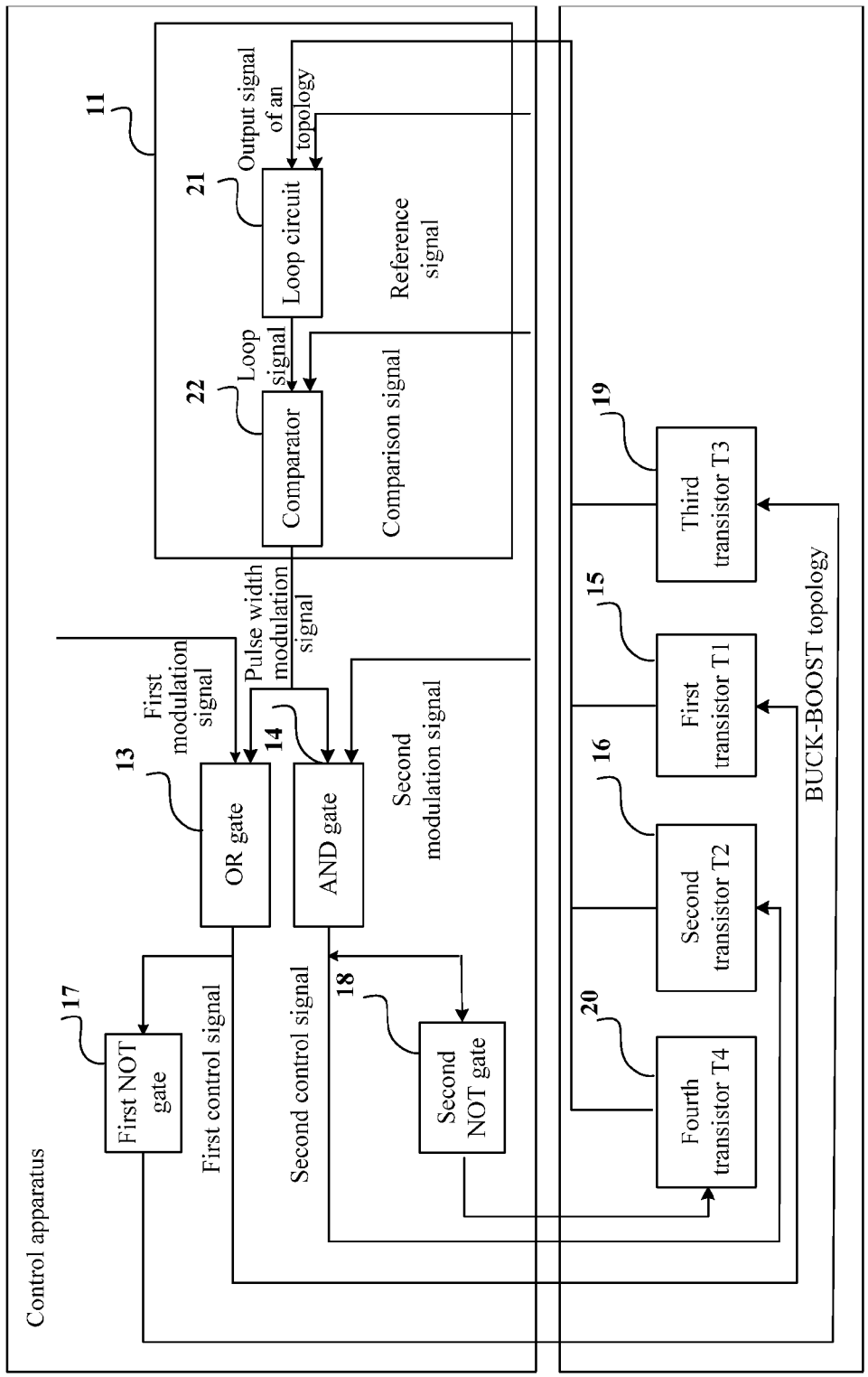
FIG. 12 is a schematic structural diagram of a control apparatus according to Embodiment 12 of the present invention.

FIG. 12 is a schematic diagram of a topology control apparatus according to an embodiment of the present invention. The apparatus is applied to a single-inductor BUCK-BOOST topology. As illustrated in the figure, the topology control apparatus provided in the embodiment specifically includes: a PWM signal generating circuit 11, an OR gate 13, and an AND gate 14.

An input end of the PWM signal generating circuit 11 is connected to an output end of the topology, an output end of the PWM signal generating circuit 11 is connected to an input end of the OR gate 13 and an input end of the AND gate 14, an output end of the OR gate 13 is connected to a grid of a first transistor 15 on the topology, and an output end of the AND gate 14 is connected to a grid of a second transistor 16 on the topology.

The PWM signal generating circuit 11 is configured to process an output signal of the topology to obtain a PWM signal. The OR gate 13 is configured to perform an OR operation between the PWM signal and a first modulation signal to obtain a first control signal, so as to control a state of the first transistor 15 on the topology. The AND gate 14 is configured to perform an AND operation between the PWM signal and a second modulation signal to obtain a second control signal, so as to control a state of the second transistor 16 on the topology.

The PWM signal generating circuit 11 consists of a loop circuit 21 and a comparator 22. The loop circuit 21 is configured to obtain a loop signal based on the output signal of the topology and a reference signal. The comparator 22 is configured to obtain the PWM signal based on the loop signal and a comparison signal. An input end of the loop circuit 21 is connected to an output end of the topology, an output end of the loop circuit 21 is connected to an input end of the comparator 22, and an output end of the comparator 22 is connected to the input end of the OR gate 13 and the input end of the AND gate 14.

Further, the apparatus includes a first NOT gate 17 and a second NOT gate 18. An input end of the first NOT gate 17 is connected to the output end of the OR gate 13, an output end of the first NOT gate 17 is connected to a grid of a third transistor 19 on the topology, an input end of the second NOT gate 18 is connected to the output end of the AND gate 14, and an output end of the second NOT gate 18 is connected to a grid of a fourth transistor 20 on the topology. The first NOT gate 17 is configured to perform a NOT operation on the first control signal to control the third transistor on the topology. The second NOT gate 18 is configured to perform a NOT operation on the second control signal to control the fourth transistor on the topology.

Specifically, an operational amplifier on the loop circuit 21 performs operational amplification on an input feedback signal of an output signal of the topology and on the reference signal. When a voltage of a feedback signal is higher than a voltage of the reference signal, a voltage of the output signal of the operational amplifier decreases, and when the voltage of the feedback signal is lower than the voltage of the reference signal, the voltage of the output signal of the operational amplifier increases. In this way, the loop signal is obtained. Its used circuit is a typical loop circuit, as illustrated in FIG. 3. The loop circuit is a negative feedback circuit, consisting of an operational amplifier X1, peripheral capacitors C1, C2, and C3, and resistors R1, R2, R3, and R4, where, at the negative input end of the operational amplifier X1, the voltage $V_{fb}$ of the feedback signal of the output signal Vo is input. The relationship between the voltage $V_{fb}$ of the feedback signal and the voltage $V_o$ of the output signal is shown in Formula (1). At the positive input end of the operational amplifier X1, the voltage $V_{ref}$ of a reference signal is input, where the value range of the voltage $V_{ref}$ of the reference signal is self-defined, ranging from 0.8V to 3V. Generally, voltage adjustment on a digital switchmode power supply is achieved by adjusting $V_{ref}$. Finally, after the operational amplifier X1 performs an operation, the loop circuit outputs the voltage of a loop COMP signal. The relationship between the voltage $V_o$ of the output signal and the voltage of a COMP signal is as follows: when the voltage $V_o$ of the output signal increases, resulting in that the voltage $V_{fb}$ of the feedback signal of the voltage $V_o$ of the output signal is higher than the voltage $V_{ref}$ of the reference signal, the operational amplifier X1 outputs a low level, that is, a COMP level decreases; when the voltage $V_o$ of the output signal decreases, the voltage of the COMP signal increases. Therefore, the function of the loop circuit is, through such a negative feedback function, to enable $V_{fb}$ to be equal to $V_{ref}$, and finally ensure that the voltage $V_o$ of the output signal stabilizes at a fixed value. The foregoing loop circuit may be achieved using an analog circuit or a digital circuit. Both analog and digital circuits are relatively mature technologies among existing technologies, so details are not provided herein again. In the embodiments of the present invention, any loop circuit may be used.

In the comparator 22, a voltage of the loop signal and a voltage of a comparison signal are input into the comparator X2, as illustrated in FIG. 3. After the comparator X2 performs comparison, a voltage of the PWM modulation signal is obtained. The voltage of the loop signal is input into the positive input end of the comparator X2, and the voltage of the comparison signal is input into the negative input end of the comparator X2, where the comparison signal is a sawtooth wave. The working principles of the comparator X2 are as follows: when the voltage of the loop signal is higher than the voltage of the comparison signal, the comparator X2 outputs a high level, and when the voltage of the loop signal is lower than the voltage of the comparison signal, the comparator X2 outputs a low level. The comparator may be achieved using an analog circuit or a digital circuit. Both analog and digital circuits are relatively mature technologies among existing technologies, so details are not provided herein again. In the embodiments of the present invention, any comparator may be used.

In the OR gate 13, the PWM modulation signal and the first modulation signal are input into the OR gate 13, a first control signal is obtained after the OR gate 13 performs an operation on the signals, and the OR gate 13 uses the first control signal to control the first transistor 15 on the single-inductor BUCK-BOOST topology, where, an input end of the OR gate 13 inputs the PWM modulation signal, and another input end inputs the first modulation signal, where the first modulation signal is pre-set based on actual situations.

In the AND gate 14, the PWM modulation signal and the second modulation signal are input into the AND gate 14, a second control signal is obtained after the AND gate 14 performs an operation on the signals and the AND gate 14 uses the second control signal to control the second transistor 16 on the single-inductor BUCK-BOOST topology, where, at one input end of the AND gate 14, the PWM modulation signal is input, and at the other input end, the second modulation signal is input, where the second modulation signal is pre-set based on actual situations.

Additionally, the third transistor 19 and the fourth transistor 20 may be switch transistors or diodes. When the third transistor 19 and the fourth transistor 20 are switch transistors, a NOT operation needs to be performed on the first control signal by the first NOT gate 17 to control the third transistor 19, and a NOT operation needs to be performed on the second control signal by the second NOT gate 18 to control the fourth transistor 20. When the third transistor 19 and the fourth transistor 20 are diodes, the apparatus neither needs the first NOT gate 17 nor the second NOT gate 18, nor needs the first control signal and the second control signal that are used for controlling diodes, because a diode is capable of automatically performing an on-off action.

The following takes the assumption that the third transistor 19 and the fourth transistor 20 are switch transistors as an example to describe how the control method provided in the embodiments of the present invention achieves the three topology states BUCK, PASS, and BOOST in detail. The duty cycle of the first modulation signal D1 is represented by r1, the duty cycle of the second modulation signal D2 is represented by r2, the duty cycle of the PWM signal is represented by r, the duty cycle of the first control signal S1 is represented by z1, and the duty cycle of the second control signal S2 is represented by z2. In addition, 1−r1, that is, the difference between 1 and the duty cycle of the first modulation signal D1, is a first threshold, and 1−r2, that is, the difference between 1 and the duty cycle of the second modulation signal D2, is a second threshold.

First, the process of how the BUCK state is achieved is described.

When the duty cycle r of the PWM modulation signal is less than 1−r1 and less than or equal to 1−r2: the OR gate performs an OR operation between the PWM modulation signal and the first modulation signal D1 to obtain the first control signal S1, to control the first transistor T1 on the topology to be in switch mode, where the duty cycle z1 of the first control signal S1 is r+r1; the AND gate performs an AND operation between the PWM modulation signal and the second modulation signal D2 to obtain the low-level second control signal S2, to control the second transistor T2 on the topology to be in constant off mode, where the duty cycle z2 of the second control signal S2 is 0; a NOT operation is performed on the first control signal S1, to control the third transistor T3 on the topology to be in switch mode, and in this case, the BUCK circuit is in the BUCK state; a NOT operation is performed on the second control signal S2, to control the fourth transistor T4 on the topology to be in constant on mode, and in this case, the BOOST circuit is in the PASS state. Therefore, in this case, the topology is in the BUCK state.

Second, the process of how the BOOST state is achieved is described.

When the duty cycle r of the PWM modulation signal is greater than 1−r2 and greater than or equal to 1−r1: the OR gate performs an OR operation between the PWM modulation signal and the first modulation signal D1 to obtain the high-level first control signal S1, to control the first transistor T1 on the topology to be in constant on mode, where the duty cycle z1 of the first control signal S1 is 100%; the AND gate performs an AND operation between the PWM modulation signal and the second modulation signal D2 to obtain the second control signal S2, to control the second transistor T2 on the topology to be in switch mode, where the duty cycle z2 of the second control signal S2 is r−(1−r2); a NOT operation is performed on the first control signal S1, to control the third transistor T3 on the topology to be in constant off mode, and in this case, the BUCK circuit is in the PASS state; a NOT operation is performed on the second control signal S2, to control the fourth transistor T4 on the topology to be in switch mode, and in this case, the BOOST circuit is in the BOOST state. Therefore, in this case, the topology is in the BOOST state.

Third, the process of how the PASS state is achieved is described.

Assuming that the duty cycle r1 of the first modulation signal D1 is greater than the duty cycle r2 of the second modulation signal D2, when the duty cycle r of the PWM modulation signal is greater than or equal to 141 and less than or equal to 1−r2: the OR gate performs an OR operation between the PWM modulation signal and the first modulation signal D1 to obtain the high-level first control signal S1, to control the first transistor T1 on the topology to be in constant on mode, where the duty cycle z1 of the first control signal S1 is 100%; the AND gate performs an AND operation between the PWM modulation signal and the second modulation signal D2 to obtain the low-level second control signal S2, to control the second transistor T2 on the topology to be in constant off mode, where the duty cycle z2 of the second control signal S2 is 0; a NOT operation is performed on the first control signal S1, to control the third transistor T3 on the topology to be in constant off mode, and in this case, the BUCK circuit is in the PASS state; a NOT operation is performed on the second control signal S2, to control the fourth transistor T4 on the topology to be in constant on mode, and in this case, the BOOST circuit is in the PASS state. Therefore, in this case, the topology is in the PASS state.

In addition, the entering to the PASS state may be achieved by checking the level of a loop COMP signal. Specifically, directly enabling, after determining that the level of a loop COMP signal is in the range from a high level to a low level, both the high-side transistor of a BUCK circuit and the high-side transistor of a BOOST circuit to be in constant on mode, may also enable a single-inductor BUCK-BOOST topology to enter the PASS state. Or, the method of detecting an input signal $V_i$ an output signal $V_o$, and output currents is used, and when the input signal $V_i$ and the output signal $V_o$ are approximately equal to each other and when the output current of each module is relatively balanced, the level of the loop signal is forcibly maintained in the signal range within which the BUCK-BOOST topology is in the PASS state.

Further, when it is assumed that the duty cycle r1 of the first modulation signal D1 is less than the duty cycle r2 of the second modulation signal D2, and when the duty cycle r of the PWM modulation signal is greater than 1−r2 and less than 1−r1: the OR gate performs an OR operation between the PWM modulation signal and the first modulation signal D1 to obtain the first control signal S1, to control the first transistor T1 on the topology to be in switch mode, where the duty cycle z1 of the first control signal S1 is equal to r+r1; the AND gate performs an AND operation between the PWM modulation signal and the second modulation signal D2 to obtain the second control signal S2, to control the second transistor T2 on the topology to be in switch mode, where the duty cycle z2 of the second control signal S2 is r−(1−r2); a NOT operation is performed on the first control signal S1, to control the third transistor T3 on the topology to be in switch mode, and in this case, the BUCK circuit is in the BUCK state; a NOT operation is performed on the second control signal S2, to control the fourth transistor T4 on the topology to be in switch mode, and in this case, the BOOST circuit is in the BOOST state. Therefore, in this case, the topology is in the BUCK-BOOST state.

In addition, the control apparatus provided in the embodiment of the present invention also ensures a smooth switchover between the BUCK state and the BOOST state. For example, when the duty cycle of the first modulation signal is 55%, the duty cycle of the second modulation signal is 45%, the voltage $V_i$ of the input signal is a high voltage, for example, 75V, and the voltage $V_o$ of the output signal is 50V, the BUCK-BOOST topology works in the BUCK state. When the input signal jumps, that is, the voltage of the input signal falls from a high voltage to a relatively low voltage, for example, jumping from 75V to 36V, the duty cycle of the PWM signal output by the loop circuit and the comparator changes from a small value to a large value. After the AND gate and the NOT gate perform operations for the PWM signal, the duty cycle of the first control signal gradually becomes larger and larger until the first transistor T1, that is, the high-side transistor of the BUCK circuit, is completely in constant on mode and the BUCK-BOOST topology enters the PASS state. When the duty cycle of the PWM modulation signal further increases, the duty cycle of the low-side transistor of the BOOST circuit starts to increase slowly from 0, until the BUCK-BOOST topology enters the BOOST state. During the entire switchover from the BUCK state to the BOOST state, the duty cycle of the high-side transistor of the BUCK circuit gradually increases until it enters the constant on mode, and the duty cycle of the low-side transistor of the BOOST circuit gradually increases from 0. The switchover process is very smooth and does not require an extra soft start operation.

Therefore, the control apparatus provided in the embodiment of the present invention, by using a PWM signal generating circuit to process an output signal of a single-inductor BUCK-BOOST topology to obtain a PWM signal, using an OR gate to perform an OR operation between the PWM signal and a first modulation signal to obtain a first control signal so as to control a state of a first transistor on the topology, and simultaneously using an AND gate to perform an AND operation between the PWM signal and a second modulation signal to obtain a second control signal so as to control a state of a second transistor, three topology states BUCK, PASS, and BOOST are achieved, and a smooth switchover among the three topology states is achieved, and a special soft start operation is not required. The apparatus, with simple implementation, can be applied in different input signal scenarios.

A person of ordinary skill in the art should also be further aware that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, the described method or algorithm steps may be implemented by hardware, a software module executed by a processor, or a combination thereof. The software module may be located in a random access memory (RAM), a memory, a read-only memory (ROM), an electrically programmable ROM, an electrically erasable programmable ROM, a register, a hard disk, a removable disk, a compact disc read-only memory (CD-ROM), or any other storage media well-known in the art.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, improvement, and so on made within the idea and principle of the present invention shall fall within the protection scope of the present invention.

What is claimed is:

1. A control method applied to a BUCK-BOOST topology, comprising:

processing an output signal of the BUCK-BOOST topology to obtain a pulse width modulation signals;
performing an OR operation between the pulse width modulation signal and a first modulation signal to obtain a first control signal to control a state of a first transistor on the BUCK-BOOST topology; and
performing an AND operation between the pulse width modulation signal and a second modulation signal to obtain a second control signal to control a state of a second transistor on the BUCK-BOOST topology,
wherein processing the output signal of the BUCK-BOOST topology to obtain the pulse width modulation signal comprises:
obtaining a loop signal based on the output signal of the BUCK-BOOST topology and a reference signal; and
obtaining the pulse width modulation signal based on the loop signal and a comparison signal.

2. The control method according to claim 1, wherein obtaining the loop signal based on the output signal of the BUCK-BOOST topology and the reference signal comprises performing operational amplification on a feedback signal of the output signal of the BUCK-BOOST topology and on the reference signal, wherein when a voltage of the feedback signal is higher than a voltage of the reference signal, a voltage of the obtained output signal decreases, and when the voltage of the feedback signal is lower than the voltage of the reference signal, the voltage of the obtained output signal increases to obtain the loop signal.

3. The control method according to claim 1, wherein obtaining the pulse width modulation signal based on the loop signal and the comparison signal comprises comparing a voltage of the input loop signal with a voltage of the comparison signal, wherein when the voltage of the loop signal is higher than the voltage of the comparison signal, the voltage of the obtained output signal is at a high level, and when the voltage of the loop signal is lower than the voltage of the comparison signal, the voltage of the obtained output signal is at a low level, and in this way, the pulse width modulation signal is obtained.

4. A control method applied to a BUCK-BOOST topology, comprising:
processing an output signal of the BUCK-BOOST topology to obtain a pulse width modulation signal;
performing an OR operation between the pulse width modulation signal and a first modulation signal to obtain a first control signal to control a state of a first transistor on the BUCK-BOOST topology; and
performing an AND operation between the pulse width modulation signal and a second modulation signal to obtain a second control signal to control a state of a second transistor on the BUCK-BOOST topology,
wherein the duty cycle of the pulse width modulation signal is less than a first threshold and less than or equal to a second threshold,
wherein performing an OR operation between the pulse width modulation signal and the first modulation signal to obtain the first control signal to control the state of the first transistor on the BUCK-BOOST topology, comprises performing an OR operation between the pulse width modulation signal and the first modulation signal to obtain the first control signal to control the first transistor to be in switch mode, and
wherein performing an AND operation between the pulse width modulation signal and the second modulation signal to obtain the second control signal to control the state of the second transistor on the BUCK-BOOST topology comprises performing an AND operation between the pulse width modulation signal and the second modulation signal to obtain the second control signal of a low-level to control the second transistor to be in constant off mode and to control the BUCK-BOOST topology to be in the BUCK state.

5. The control method according to claim 4, further comprising performing a NOT operation on the first control signal to control a third transistor on the BUCK-BOOST topology to be in switch mode, and performing a NOT operation on the second control signal to control a fourth transistor on the BUCK-BOOST topology to be in constant on mode.

6. A control method applied to a BUCK-BOOST topology, comprising:
processing an output signal the BUCK-BOOST topology to obtain a pulse width modulation signal;
performing an OR operation between the pulse width modulation signal and a first modulation signal to obtain a first control signal to control a state of a first transistor on the BUCK-BOOST topology; and
performing an AND operation between the pulse width modulation signal and a second modulation signal to obtain a second control signal to control a state of a second transistor on the BUCK-BOOST topology,
wherein the duty cycle of the pulse width modulation signal is greater than or equal to a first threshold and greater than a second threshold,
wherein performing the OR operation between the pulse width modulation signal and the first modulation signal to obtain the first control signal to control the state of the first transistor on the BUCK-BOOST topology comprises performing an OR operation between the pulse width modulation signal and the first modulation signal to obtain the first control signal of a high-level to control the first transistor to be in constant on mode, and
wherein performing the AND operation between the pulse width modulation signal and the second modulation signal to obtain the second control signal to control the state of the second transistor on the BUCK-BOOST topology comprises performing an AND operation between the pulse width modulation signal and the second modulation signal to obtain the second control signal to control the second transistor to be in switch mode and to control the BUCK-BOOST topology to be in the BOOST state.

7. The control method according to claim 6, further comprising:
performing a NOT operation on the first control signal to control a third transistor on the BUCK-BOOST topology to be in constant off mode; and
performing a NOT operation on the second control signal to control a fourth transistor on the BUCK-BOOST topology to be in switch mode.

8. A control method applied to a BUCK-BOOST topology, comprising:
processing an output signal of the BUCK-BOOST topology to obtain a pulse width modulation signal;
performing an OR opeeration between the pluse width modulation signal and a first modulation signal to obtain a first control signal to control a state of a first transistor on the BUCK-BOOST topology; and
performing an AND operation between the pulse width modulation signal and a second modulation signal to obtain a second control signal to control a state of a second transistor on the BUCK-BOOST topology,
wherein the duty cycle of the first modulation signal is greater than the duty cycle of the second modulation signal, and the duty cycle of the pulse width modulation signal is greater than a first threshold and less than the second threshold, wherein performing the OR operation between the pulse width modulation signal and the first modulation signal to obtain the first control signal to control the state of the first transistor on the BUCK-BOOST topology comprises performing an OR operation between the input pulse width modulation signal and the first modulation signal to obtain a high-level first control signal to control the first transistor to be in constant on mode, and wherein performing the AND operation between the pulse width modulation signal and the second modulation signal to obtain the second control signal to control the state of the second transistor on the BUCK-BOOST topology comprises performing an AND operation between the input pulse width modulation signal and the second modulation signal to obtain a low-level second control signal to control the second transistor to be in constant off mode and to control the BUCK-BOOST topology to be in the PASS state.

9. The control method according to claim 8, further comprising:
performing a NOT operation on the first control signal to control a third transistor on the BUCK-BOOST topology to be in constant off mode; and
performing a NOT operation on the second control signal to control a fourth transistor on the BUCK-BOOST topology to be in constant on mode.

10. A control method applied to a BUCK-BOOST topology, comprising:
processing an output signal of the BUCK-BOOST topology to obtain a pulse width modulation signal;
performing an OR operation between the pulse width modulation signal and a first modulation signal to obtain a first control signal to control a state of a first transistor on the BUCK-BOOST topology; and
performing an AND operation between the pulse width modulation signal and a second modulation signal to obtain a second control signal to control a state of a second transistor on the BUCK-BOOST topology,
wherein the duty cycle of the first modulation signal is less than the duty cycle of the second modulation signal, and the duty cycle of the pulse width modulation signal is less than a first threshold and greater than a second threshold,
wherein performing the OR operation between the pulse width modulation signal and the first modulation signal to obtain the first control signal to control the state of the first transistor on the BUCK-BOOST topology comprises performing an OR operation between the input pulse width modulation signal and the first modulation signal to obtain the first control signal to control the first transistor to be in switch mode, and
wherein performing the AND operation between the pulse width modulation signal and the second modulation signal to obtain the second control signal to control the state of the second transistor on the BUCK-BOOST topology comprises performing an AND operation between the input pulse width modulation signal and the second modulation signal to obtain the second control signal to control the second transistor to be in switch mode and to control the BUCK-BOOST topology to be in the BUCK-BOOST state.

11. The control method according to claim 10, further comprising:
performing a NOT operation on the first control signal to control a third transistor on the BUCK-BOOST topology to be in switch mode; and
performing a NOT operation on the second control signal to control a fourth transistor on the BUCK-BOOST topology to be in switch mode.

12. A control method applied to a BUCK-BOOST topology, comprising:
processing an output signal of the BUCK-BOOST topology to obtain a pulse width modulation signal;
performing an OR operation between the pulse width modulation signal and a first modulation signal to obtain a first control signal to control a state of a first transistor on the BUCK-BOOST topology; and
performing an AND operation between the pulse width modulation signal and a second modulation signal to obtain a second control signal to control a state of a second transistor on the BUCK-BOOST topology,
wherein the first threshold is equal to the difference between one and the duty cycle of the first modulation signal, and
wherein the second threshold is equal to the difference between one and the duty cycle of the second modulation signal.

13. A control apparatus applied to a BUCK-BOOST topology comprising:
a pulse width modulation signal generating circuit;
an OR gate; and
an AND gate,
wherein an input end of the pulse width modulation signal generating circuit is connected to an output end of the BUCK-BOOST topology, an output end of the pulse width modulation signal generating circuit is connected to each of an input end of the OR gate and an input end of the AND gate, an output end of the OR gate is connected to a gate of a first transistor on the BUCK-BOOST topology, and an output end of the AND gate is connected to a grid of a second transistor on the BUCK-BOOST topology,
wherein the pulse width modulation signal generating circuit is configured to process an output signal of the BUCK-BOOST topology to obtain a pulse width modulation signal, and to transmit the pulse width modulation signal to the OR gate and the AND gate,
wherein the OR gate is configured to receive the pulse width modulation signal from the pulse width modulation signal generating circuit, and perform an OR operation between the pulse width modulation signal and a first modulation signal to obtain a first control signal to control a state of the first transistor on the BUCK-BOOST topology,
wherein the AND gate is configured to receive the pulse width modulation signal from the pulse width modulation signal generating circuit, and perform an AND operation between the pulse width modulation signal and a second modulation signal to obtain a second control signal to control a state of the second transistor on the BUCK-BOOST topology,
wherein the pulse width modulation signal generating circuit comprises a loop circuit and a comparator,
wherein an input end of the loop circuit is connected to an output end of the BUCK-BOOST topology, an output end of the loop circuit is connected to an input end of the comparator, and an output end of the comparator is connected to the input end of the OR gate and the input end of the AND gate, wherein the loop circuit is configured to obtain a loop signal based on the output signal of the BUCK-BOOST topology and a reference signal, and wherein the comparator is configured to receive the loop signal from the loop circuit, and compare the loop signal with a comparison signal to obtain the pulse width modulation signal.

14. A control apparatus applied to a BUCK-BOOST topology, comprising:

a pulse width modulation signal generating circuit;
an OR gate; and
an AND gate, wherein an input end of the pulse width modulation signal generating circuit is connected to an output end of the BUCK-BOOST topology, an output end of the pulse width modulation signal generating circuit is connected to each of an input end of the OR gate and an input end of the AND gate, an output end of the OR gate is connected to a gate of a first transistor on the BUCK-BOOST topology, and an output end of the AND gate is connected to a grid of a second transistor on the BUCK-BOOST topology, wherein the pulse width modulation signal generating circuit is configured to process an output signal of the BUCK-BOOST topology to obtain a pulse width modulation signal, and to transmit the pulse width modulation signal to the OR gate and the AND gate, wherein the OR gate is configured to receive the pulse width modulation signal from the pulse width modulation signal generating circuit, and perform an OR operation between the pulse width modulation signal and a first modulation signal to obtain a first control signal to control a state of the first tram on the BUCK-BOOST topology, wherein the AND gate is configured to receive the pulse width modulation signal from the pulse width modulation signal generating circuit, and perform an AND operation between the pulse width modulation signal and a second modulation signal to obtain a second control signal to control a state of the second transistor on the BUCK-BOOST topology, wherein the control apparatus further comprises an operational amplifier, wherein the operational amplifier is configured to perform operational amplification on an input feedback signal of the output signal of the BUCK-BOOST topology and on the reference signal, and wherein when a voltage of the feedback signal is higher than a voltage of the reference signal, a voltage of the output signal of the operational amplifier decreases, and when the voltage of the feedback signal is lower than the voltage of the reference signal, the voltage of the output signal of the operational amplifier increases to obtain the loop signal.

15. The control apparatus according to claim 13, wherein the comparator is specifically configured to compare a voltage of the loop signal with a voltage of the comparison signal, wherein when the voltage of the loop signal is higher than the voltage of the comparison signal, the comparator outputs a high level, and when the voltage of the loop signal is lower than the voltage of the comparison signal, the comparator outputs a low level to obtain the pulse width modulation signal.

16. A control apparatus applied to a BUCK-BOOST topology, comprising:

a pulse width modulation signal generating circuit;
an OR gate; and
an AND gate, wherein an input end of the pulse width modulation signal generating circuit is connected to an output end of the BUCK-BOOST topology, an output end of the pulse width modulation signal generating circuit is connected to each of an input end of the OR gate and an input end of the AND gate, an output end of the OR gate is connected to a gate of a first transistor on the BUCK-BOOST topology, and an output end of the AND gate is connected to a grid of a second transistor on the BUCK-BOOST topology, wherein the pulse width modulation signal generating circuit is configured to process an output signal of the BUCK-BOOST topology to obtain a pulse width modulation signal, and to transmit the pulse width modulation signal to the OR gate and the AND gate, wherein the OR gate is configured to receive the pulse width modulation signal from the pulse width modulation signal generating circuit, and perform an OR operation between the pulse width modulation signal and a first modulation signal to obtain a first control signal to control a state of the first transistor on the BUCK-BOOST topology, wherein the AND gate is configured to receive the pulse width modulation signal from the pulse width modulation signal generating circuit, and perform an AND operation between the pulse width modulation signal and a second modulation signal to obtain a second control signal to control a state of the second transistor on the BUCK-BOOST topology, wherein the duty cycle of the pulse width modulation signal is less than a first threshold and less than or equal to a second threshold, wherein the OR gate is specifically configured to perform an OR operation between the input pulse width modulation signal and the first modulation signal to obtain the first control signal to control the first transistor to be in switch mode, and wherein the AND gate is specifically configured to perform an AND operation between the input pulse width modulation signal and the second modulation signal to obtain a low-level second control signal to control the second transistor to be in constant off mode and to further control the BUCK-BOOST topology to be in the BUCK state.

17. The control apparatus according to claim 16, wherein the apparatus further comprises a first NOT gate and a second NOT gate, wherein an input end of the first NOT gate is connected to the output end of the OR gate, an output end of the first NOT gate is connected to a gate of a third transistor on the BUCK-BOOST topology, an input end of the second NOT gate is connected to the output end of the AND gate, and an output end of the second NOT gate is connected to a gate of a fourth transistor on the BUCK-BOOST topology, wherein the first NOT gate is configured to perform a NOT operation on the first control signal to control the third transistor on the BUCK-BOOST topology to be in switch mode, and wherein the second NOT gate is configured to perform a NOT operation on the second control signal to control the fourth transistor on the BUCK-BOOST topology to be in constant on mode.

18. A control apparatus applied to a BUCK-BOOST topology, comprising:

a pulse width modulation signal generating circuit;
an OR gate; and
an AND gate, wherein an input end of the pulse width modulation signal generating circuit is connected to an output end of the BUCK-BOOST topology, an output end of the pulse width modulation signal generating circuit is connected to each of an input end of the OR gate and an input end of the AND gate, an output end of the OR gate is connected to a gate of a first transistor on the BUCK-BOOST topology, and an output end of the AND gate is connected to a grid of a second transistor on the BUCK-BOOST topology, wherein the pulse width modulation signal generating circuit is configured to process an output singal of the BUCK-BOOST topology to obtain a pulse width modulation signal, and to transmit the pulse width modulation signal to the OR gate and the AND gate, wherein the OR gate is configured to receive the pulse width modulation signal from the pulse width modulation signal generating circuit, and perform an OR operation between the pulse width modulation signal and a first modulation signal to obtain a first control signal to control a state of the first transistor on the BUCK-BOOST topology, wherein the AND gate is configured to receive the pulse width modulation signal from the pulse width modulation signal generating circuit, and perform an AND operation between the pulse width modulation signal and a second modulation signal to obtain a second control signal to control a state of the second transistor on the BUCK-BOOST topology, wherein the duty cycle of the pulse width modulation signal is greater than or equal to a first threshold and greater than a second threshold, wherein the OR gate is specifically configured to perform an OR operation between the input pulse width modulation signal and the first modulation signal to obtain a high-level first control signal to control the first transistor to be in constant on mode, and wherein the AND gate is specifically configured to perform an AND operation between the input pulse width modulation signal and the second modulation signal to obtain the second control signal to control the second transistor to be in switch mode and to further control the BUCK-BOOST topology to be in the BOOST state.

19. The control apparatus according to claim 18, wherein the apparatus further comprises a first NOT gate and a second NOT gate, wherein an input end of the first NOT gate is connected to the output end of the OR gate, an output end of the first NOT gate is connected to a gate of a third transistor on the BUCK-BOOST topology, an input end of the second NOT gate is connected to the output end of the AND gate, and an output end of the second NOT gate is connected to a gate of a fourth transistor on the BUCK-BOOST topology, wherein the first NOT gate is configured to perform a NOT operation on the first control signal to control the third transistor on the BUCK-BOOST topology to be in constant off mode, and wherein the second NOT gate is configured to perform a NOT operation on the second control signal to control the fourth transistor on the BUCK-BOOST topology to be in switch mode.

20. A control apparatus applied to a BUCK-BOOST topology, comprising:
a pulse width modulation signal generating circuit;
an OR gate; and
an AND gate,
wherein an input end of the pulse width modulation signal generating circuit is connected to an output end of the BUCK-BOOST topology, an output end of the pulse width modulation signal generating circuit is connected to each of an input end of the OR gate and an input end of the AND gate, an output end of the OR gate is connected to a gate of a first transistor on the BUCK-BOOST topology, and an output end of the AND gate is connected to a grid of a second transistor on the BUCK-BOOST topology, wherein the pulse width modulation signal generating circuit is configured to process an output signal of the BUCK-BOOST topology to obtain a pulse width modulation signal, and to transmit the pulse width modulation signal to the OR gate and the AND gate, wherein the OR gate is configured to receive the pulse width modulation signal from the pulse width modulation signal generating circuit, and perform an OR operation between the pulse width modulation signal and a first modulation signal to obtain a first control signal to control a state of the first transistor on the BUCK-BOOST topology, wherein the AND gate is configured to receive the pulse width modulation signal from the pulse width modulation signal generating circuit, and perform an AND operation between the pulse width modulation signal and a second modulation signal to obtain a second control signal to control a state of the second transistor on the BUCK-BOOST topology, wherein the duty cycle of the first modulation signal is greater than the duty cycle of the second modulation signal, and the duty cycle of the pulse width modulation signal is greater than a first threshold and less than a second threshold, wherein the OR gate is specifically configured to perform an OR operation between the input pulse width modulation signal and the first modulation signal to obtain a high-level first control signal to control the first transistor to be in constant on mode, and wherein the AND gate is specifically configured to perform an AND operation between the input pulse width modulation signal and the second modulation signal to obtain a low-level second control signal to control the second transistor to be in constant off mode and to further control the BUCK-BOOST topology to be in the PASS state.

21. The control apparatus according to claim 20, wherein the apparatus further comprises a first NOT gate and a second NOT gate, wherein an input end of the first NOT gate is connected to the output end of the OR gate, an output end of the first NOT gate is connected to a gate of a third transistor on the BUCK-BOOST topology, an input end of the second NOT gate is connected to the output end of the AND gate, and an output end of the second NOT gate is connected to a gate of a fourth transistor on the BUCK-BOOST topology, wherein the first NOT gate is configured to perform a NOT operation on the first control signal to control the third transistor on the BUCK-BOOST topology to be in constant off mode, and wherein the second NOT gate is configured to perform a NOT operation on the second control signal to control the fourth transistor on the BUCK-BOOST topology to be in constant on mode.

22. A control apparatus applied to a BUCK-BOOST topology, comprising:
a pulse width modulation signal generating circuit;
an OR gate; and
an AND gate,
wherein an input end of the pulse width modulation signal generating circuit is connected to an output end of the BUCK-BOOST topology, an output end of the pulse width modulation signal generating circuit is connected to each of an input end of the OR gate and an input end of the AND gate, an output end of the OR gate is connected to a gate of a first transistor on the BUCK-BOOST topology, and an output end of the AND gate is connected to a grid of a second transistor on the BUCK-BOOST topology, wherein the pulse width modulation signal generating circuit is configured to process an output signal of the BUCK-BOOST topology to obtain a pulse width modulation signal, and to transmit the pulse width modulation signal to the OR gate and the AND gate, wherein the OR gate is configured to receive the pulse width modulation signal from the pulse width modulation signal generating circuit, and perform an OR operation between the pulse width modulation signal and a first modulation signal to obtain a first control signal to control a state of the first transistor on the BUCK-BOOST topology, wherein the AND gate is configured to receive the pulse width modulation signal from the pulse width modulation signal generating circuit, and perform an AND operation between the pulse width modulation signal and a second modulation signal to obtain a second control signal to control a state of the second transistor on the BUCK-BOOST topology, wherein the duty cycle of the first modulation signal is less than the duty cycle of the second modulation signal, and the duty cycle of the pulse width modulation signal is less than a first threshold and greater than a second threshold, wherein the OR gate is specifically configured to perform an OR operation between the input pulse width modulation signal and the first modulation signal to obtain the first control signal to control the first transistor to be in switch mode, and wherein the AND gate is specifically configured to perform an AND operation between the input pulse width modulation signal and the second modulation signal to obtain the second control signal to control the second transistor to he in switch mode and to further control the BUCK-BOOST topology to be in the BUCK-BOOST state.

23. The control apparatus according to claim 22, wherein the apparatus further comprises a first NOT gate and a second NOT gate, wherein an input end of the first NOT gate is connected to the output end of the OR gate, an output end of the first NOT gate is connected to a gate of a third transistor on the BUCK-BOOST topology, an input end of the second NOT gate is connected to the output end of the AND gate, and an output end of the second NOT gate is connected to a gate of a fourth transistor on the BUCK-BOOST topology, wherein the first NOT gate is configured to perform a NOT operation on the first control signal to control the third transistor on the BUCK-BOOST topology to he in switch mode, and wherein the second NOT gate is configured to perform a NOT operation on the second control signal to control the fourth transistor on the BUCK-BOOST topology to be in switch mode.

24. A control apparatus applied to a BUCK-BOOST topology, comprising:
a pulse width modulation signal generating circuit;
an OR gate; and
an AND gate,
wherein an input end of the pulse with modulation signal generating circuit is connected to an output end of the BUCK-BOOST topology, an output end of the pulse width modulation signal generating circuit is connected to each of an input end of the OR gate and an input end of the AND gate, an output end of the OR gate is connected to a gate of a first transistor on the BUCK-BOOST topology, and an output end of the AND gate is connected to a grid of a second transistor on the BUCK-BOOST topology, wherein the pulse width modulation signal generating circuit is configured to process an output signal of the BUCK-BOOST topology to obtain a pulse width modulation signal, and to transmit the pulse width modulation signal to the OR gate and the AND gate, wherein the OR gate is configured to receive the pulse width modulation signal from the pulse width modulation signal generating circuit, and perform an OR operation between the pulse width modulation signal and a first modulation signal to obtain a first control signal to control a state of the first transistor on the BUCK-BOOST topology, wherein the AND gate is configured to receive the pulse width modulation signal from the pulse width modulation signal generating circuit, and perform an AND operation between the pulse width modulation signal and a second modulation signal to obtain a second control signal to control a state of the second transistor on the BUCK-BOOST topology, wherein the first threshold is equal to the difference between one and the duty cycle of the first modulation signal, and wherein the second threshold is equal to the difference between one and the duty cycle of the second modulation signal.

* * * * *